United States Patent
Xu (10) Patent No.: US 10,819,465 B2
(45) Date of Patent: Oct. 27, 2020

(54) METHOD FOR TRANSMITTING CSI-RS AND BASE STATION

(71) Applicant: HUAWEI TECHNOLOGIES CO., LTD., Shenzhen, Guangdong (CN)

(72) Inventor: Kai Xu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 310 days.

(21) Appl. No.: 15/750,803

(22) PCT Filed: Dec. 15, 2015

(86) PCT No.: PCT/CN2015/097510
§ 371 (c)(1),
(2) Date: Feb. 6, 2018

(87) PCT Pub. No.: WO2017/101029
PCT Pub. Date: Jun. 22, 2017

(65) Prior Publication Data
US 2020/0092036 A1    Mar. 19, 2020

(51) Int. Cl.
*H04L 1/00*     (2006.01)
*H04L 5/00*     (2006.01)
*H04W 76/27*   (2018.01)

(52) U.S. Cl.
CPC .......... *H04L 1/0026* (2013.01); *H04L 5/0051* (2013.01); *H04W 76/27* (2018.02)

(58) Field of Classification Search
CPC ... H04L 1/0026; H04L 5/0051; H04L 5/0057; H04L 5/0053
See application file for complete search history.

(56) References Cited

U.S. PATENT DOCUMENTS

2013/0343300 A1   12/2013   Kim et al.
2014/0098689 A1*   4/2014   Lee .................. H04B 7/0469
                                                370/252
(Continued)

FOREIGN PATENT DOCUMENTS

CN     103002581 A     3/2013
CN     103179664 A     6/2013
(Continued)

OTHER PUBLICATIONS

Office Action issued in Chinese Application No. 201580077667.4 dated Jun. 4, 2019, 6 pages.
(Continued)

*Primary Examiner* — Kent Krueger
(74) *Attorney, Agent, or Firm* — Fish & Richardson P.C.

(57) ABSTRACT

Methods for transmitting a channel state information-reference signals (CSI-RS) and a base station are provided, where the example method includes aggregating, by the base station, first configuration modes of K CSI-RSs to form a second configuration mode of the CSI-RSs, where K is an integer greater than or equal to 2, where each of the first configuration modes is a configuration mode of X ports, where a value of X is 2, 4, or 8, and where the first configuration mode includes a position of a resource element corresponding to each of the X ports. The second configuration mode is a configuration mode of X*K ports, and the second configuration mode includes a position of a resource element corresponding to each of the X*K ports. The method further includes sending, by the base station, a CSI-RS to user equipment UE using the second configuration mode of the CSI-RSs.

14 Claims, 8 Drawing Sheets

Eight CSI-RS ports (56) References Cited

U.S. PATENT DOCUMENTS

2015/0124732 A1    5/2015  Seo et al.
2015/0201346 A1    7/2015  Wu et al.
2016/0248562 A1*   8/2016  Nam .................. H04L 27/2601

FOREIGN PATENT DOCUMENTS

CN      103746779 A     4/2014
WO      2014047797 A1   4/2014
WO      2014052806 A1   4/2014

OTHER PUBLICATIONS

Extended European Search Report issued in European Application No. 15910502.2 dated Aug. 28, 2018, 8 pages.
International Search Report and Written Opinion in International Application No. PCT/CN2015/097510, dated Sep. 8, 2016, 13 pages.

* cited by examiner

Two CSI-RS ports

Eight CSI-RS ports

METHOD FOR TRANSMITTING CSI-RS AND BASE STATION

CROSS-REFERENCE TO RELATED APPLICATIONS

This application is a national stage of International Application No. PCT/CN2015/097510, filed on Dec. 15, 2015, which is hereby incorporated by reference in its entirety.

TECHNICAL FIELD

The present invention relates to the communications field, and in particular, to a method for transmitting a channel state information-reference signal (Channel State Information Reference Signal, CSI-RS) and a base station.

BACKGROUND

With development of mobile communications, the $4^{th}$ generation mobile communications has already been commercially used. The industry is making greater efforts to develop a wireless communications network of a next-generation mobile communications, that is, the $5^{th}$ generation mobile communications (5G). Evolution of a mobile communications system causes a continuous increase in a bandwidth requirement. Because frequency resources applicable to mobile communications are quite limited, to meet the bandwidth requirement, spectral efficiency and a throughput of a Long Term Evolution (Long Term Evolution, LTE) system need to be increased according to an increased quantity of users and an increased quantity of flows. For example, the LTE R13 (Release 13, Release 13) standard to be launched starts to consider introducing more antenna port configurations, so as to increase a quantity of users and a quantity of flows.

In an actual communication process, when data is sent to user equipment (User Equipment, UE) by using an antenna port, different types of reference signals need to be sent to the UE, so as to perform channel estimation or channel state measurement or channel quality measurement, for example, send a channel state information-reference signal (Channel State Information Reference Signal, CSI-RS) to the UE to perform channel state measurement, so as to schedule the UE. For example, in a 3GPP (the 3rd Generation Partnership Project, the 3rd Generation Partnership Project) LTE R10 (Release 10, Release 10) downlink system, quantities of antenna ports supported by different types of reference signals are different, and a reference signal supports a maximum of eight antenna ports. In this case, if more antenna port configurations are introduced, to increase the quantity of users and the quantity of flows; in this case, if more antenna port configurations are introduced, to increase the quantity of users and the quantity of flows, more CSI-RS ports need to be added to support an increased quantity of users and an increased quantity of flows in the system.

Figure 1:
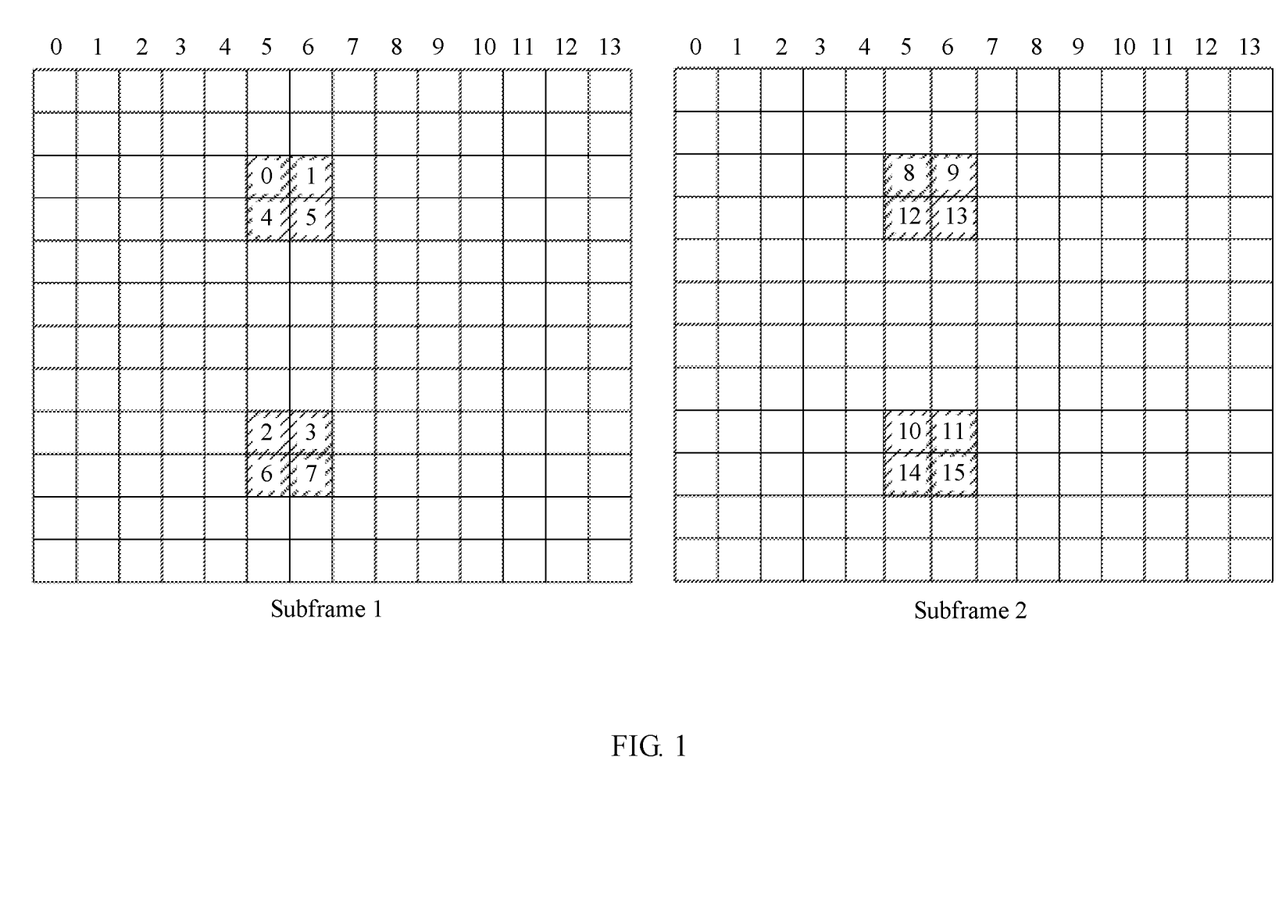
FIG. 1 is a schematic diagram of an existing method for increasing a quantity of ports.

Accordingly, a technical solution of increasing a quantity of new ports in another subframe or in a different physical resource block (Physical Resource Block, PRB) is used in the prior art, to provide a total quantity of ports in the system. For example, as shown in FIG. 1, eight ports in a subframe (Subframe) 1 and eight ports in a subframe 2 are configured together as 16 ports to send a CSI-RS reference signal. However, the existing technical solution of increasing a quantity of new ports in a time domain or a frequency domain achieves an objective of increasing the quantity of ports by completely depending on orthogonality of the time domain or the frequency domain, and is relatively sensitive to time selectivity or frequency selectivity of a channel. This does not facilitate an operation such as channel interpolation, and a system performance loss is relatively large.

SUMMARY

To resolve the foregoing technical problem, embodiments of the present invention provide a method for transmitting a CSI-RS and a base station, so as to resolve an existing problem of a relatively large system performance loss caused by increasing a quantity of ports by using orthogonality of a time domain or a frequency domain.

To achieve the foregoing objective, the following technical solutions are used in the embodiments of the present invention.

According to a first aspect, an embodiment of the present invention provides a method for transmitting a CSI-RS, including:

aggregating, by a base station, first configuration modes of K channel state information-reference signals CSI-RSs, to form a second configuration mode of the CSI-RSs, where K is an integer greater than or equal to 2, each of the first configuration modes is a configuration mode of X ports, a value of X is 2, 4, or 8, and the first configuration mode includes a position of a resource element corresponding to each of the X ports; the second configuration mode is a configuration mode of X*K ports, and the second configuration mode includes a position of a resource element corresponding to each of the X*K ports; and sending, by the base station, a CSI-RS to user equipment UE by using the second configuration mode of the CSI-RSs.

Optionally, after the UE receives the CSI-RS that is sent by the base station by using the second configuration mode of the CSI-RSs, to enable the UE to accurately perform channel state measurement according to the CSI-RSs, determine channel state information, and feed back the channel state information to the base station, in a first possible implementation of the first aspect, the method may further include:

sending, by the base station, radio resource control RRC signaling or a system information block SIB message to the UE, where the RRC signaling or the SIB message includes a bit block, bits included in the bit block are in a one-to-one correspondence with first configuration modes of CSI-RSs included in the PRB pair, and the bits are used to indicate an aggregation status of the first configuration modes of the CSI-RSs corresponding to the bits.

Specifically, the aggregation status of the first configuration modes may be indicated by using bits 0 or bits 1; and if the bits are 1, it indicates that the first configuration modes of the CSI-RSs corresponding to the bits are aggregated; or if the bits are 0, it indicates that the first configuration modes of the CSI-RSs corresponding to the bits are not aggregated.

In addition, in an LTE system, reference signals in each PRB pair may be numbered from 0 to 14. Therefore, to avoid a repetition of the existing numbers in the existing LTE system, in this embodiment of the present invention, a port of the second configuration mode obtained after aggregation starts to be numbered from 15, and specific implementation is as follows:

a port number n of the second configuration mode of the CSI-RSs may be:

$$n = i*N + p, (p = 15, \ldots, 14 + N); \text{ or}$$

$$n = \begin{cases} p + \dfrac{N}{2}i & \text{for } p = 15, \ldots, 14 + N/2 \\ p + \dfrac{N}{2}(i + K - 1) & \text{for } p = 15 + N/2, \ldots, 14 + N \end{cases},$$

where i∈{0, 1, ..., K−1}, i indicates a first configuration mode of an $i^{th}$ CSI-RS in the first configuration modes of the K CSI-RSs, and N is a quantity of ports corresponding to the second configuration mode of the CSI-RSs.

According to a second aspect, an embodiment of the present invention provides a base station, where the base station may include:

an aggregation unit, configured to aggregate first configuration modes of K channel state information-reference signals CSI-RSs, to form a second configuration mode of the CSI-RSs, where K is an integer greater than or equal to 2, each of the first configuration modes is a configuration mode of X ports, a value of X is 2, 4, or 8, and the first configuration mode includes a position of a resource element corresponding to each of the X ports; the second configuration mode is a configuration mode of X*K ports, and the second configuration mode includes a position of a resource element corresponding to each of the X*K ports; and a sending unit, configured to send a CSI-RS to user equipment UE by using the second configuration mode, which is obtained through aggregation by the aggregation unit, of the CSI-RSs.

Optionally, after the UE receives the CSI-RS that is sent by the base station by using the second configuration mode of the CSI-RSs, to enable the UE to accurately perform channel state measurement according to the CSI-RSs, determine channel state information, and feed back the channel state information to the base station, in a first possible implementation of the second aspect, the sending unit is further configured to:

before the sending unit sends the CSI-RS to the user equipment UE by using the second configuration mode of the CSI-RSs, send radio resource control RRC signaling or a system information block SIB message to the UE, where the RRC signaling or the SIB message includes a bit block, bits included in the bit block are in a one-to-one correspondence with first configuration modes of CSI-RSs included in the PRB pair, and the bits are used to indicate an aggregation status of the first configuration modes of the CSI-RSs corresponding to the bits.

Specifically, the aggregation status of the first configuration modes may be indicated by using bits 0 or bits 1; and if the bits are 1, it indicates that the first configuration modes of the CSI-RSs corresponding to the bits are aggregated; or if the bits are 0, it indicates that the first configuration modes of the CSI-RSs corresponding to the bits are not aggregated.

In addition, in an LTE system, reference signals in each PRB pair may be numbered from 0 to 14. Therefore, to avoid repetition of the existing numbers in the existing LTE system, in this embodiment of the present invention, a port of the second configuration mode obtained after aggregation starts to be numbered from 15, and specific implementation is as follows:

a port number n of the second configuration mode of the CSI-RSs is:

$$n = i*N + p, (p = 15, \ldots, 14 + N); \text{ or}$$

$$n = \begin{cases} p + \dfrac{N}{2}i & \text{for } p = 15, \ldots, 14 + N/2 \\ p + \dfrac{N}{2}(i + K - 1) & \text{for } p = 15 + N/2, \ldots, 14 + N \end{cases},$$

where i∈{0, 1, ..., K−1}, i indicates a first configuration mode of an $i^{th}$ CSI-RS in the first configuration modes of the K CSI-RSs, and N is a quantity of ports corresponding to the second configuration mode of the CSI-RSs.

According to a third aspect, an embodiment of the present invention further provides a base station, including:

a processor, configured to aggregate first configuration modes of K channel state information-reference signals CSI-RSs, to form a second configuration mode of the CSI-RSs, where K is an integer greater than or equal to 2, each of the first configuration modes is a configuration mode of X ports, a value of X is 2, 4, or 12, and the first configuration mode includes a position of a resource element corresponding to each of the X ports; the second configuration mode is a configuration mode of X*K ports, and the second configuration mode includes a position of a resource element corresponding to each of the X*K ports; and a communications unit, configured to send a CSI-RS to user equipment UE by using the second configuration mode, which is obtained through aggregation by the processor, of the CSI-RSs.

Optionally, after the UE receives the CSI-RS that is sent by the base station by using the second configuration mode of the CSI-RSs, to enable the UE to accurately perform channel state measurement according to the CSI-RSs, determine channel state information, and feed back the channel state information to the base station, in a first possible implementation of the third aspect, the communications unit is further configured to:

before the communications unit sends the CSI-RS to the user equipment UE by using the second configuration mode of the CSI-RSs, send radio resource control RRC signaling or a system information block SIB message to the UE, where the RRC signaling or the SIB message includes a bit block, bits included in the bit block are in a one-to-one correspondence with first configuration modes of CSI-RSs included in the PRB pair, and the bits are used to indicate an aggregation status of the first configuration modes of the CSI-RSs corresponding to the bits.

Specifically, the aggregation status of the first configuration modes may be indicated by using bits 0 or bits 1; and if the bits are 1, it indicates that the first configuration modes of the CSI-RSs corresponding to the bits are aggregated; or if the bits are 0, it indicates that the first configuration modes of the CSI-RSs corresponding to the bits are not aggregated.

In addition, in an LTE system, reference signals in each PRB pair may be numbered from 0 to 14. Therefore, to avoid repetition of the existing numbers in the existing LTE system, in this embodiment of the present invention, a port of the second configuration mode obtained after aggregation starts to be numbered from 15, and specific implementation is as follows:

a port number n of the second configuration mode of the CSI-RSs is:

$$n = i*N + p, (p = 15, \ldots, 14+N); \text{ or}$$

$$n = \begin{cases} p + \dfrac{N}{2}i & \text{for } p = 15, \ldots, 14+N/2 \\ p + \dfrac{N}{2}(i+K-1) & \text{for } p = 15+N/2, \ldots, 14+N \end{cases},$$

where $i \in \{0, 1, \ldots, K-1\}$, i indicates a first configuration mode of an $i^{th}$ CSI-RS in the first configuration modes of the K CSI-RSs, and N is a quantity of ports corresponding to the second configuration mode of the CSI-RSs.

It can be learned from the foregoing description that, the embodiments of the present invention provide a method for transmitting a CSI-RS. The base station first aggregates the first configuration modes of the K channel state information-reference signals CSI-RSs, to form the second configuration mode of the CSI-RSs, where K is an integer greater than or equal to 2, each of the first configuration modes is a configuration mode of the X ports, the value of X is 2, 4, or 8, and the first configuration mode includes the position of the resource element corresponding to each of the X ports; the second configuration mode is a configuration mode of the X*K ports, and the second configuration mode includes the position of the resource element corresponding to each of the X*K ports; and then the base station sends a CSI-RS to the user equipment UE by using the second configuration mode of the CSI-RSs. In this way, a quantity of ports of a system is increased by means of aggregation of existing port configuration modes. This slightly affects a conventional network and a terminal, greatly improves a data throughput and performance of an entire system, plays a key role in improving data sending performance of a control layer plane and a data plane, and resolves an existing problem of a relatively large system performance loss caused by increasing a quantity of ports by using orthogonality of a time domain or a frequency domain.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

A main principle of the present invention is: Two ports, four ports, or eight ports of CSI-RS reference signals included in a current LTE system are aggregated to design a configuration mode of 12 ports, 16 ports, or more ports, and a CSI-RS reference signal is sent to user equipment UE according to the designed configuration mode. A quantity of ports of a system is increased by means of aggregation of existing port configuration modes. This slightly affects a conventional network and a terminal, greatly improves a data throughput and performance of an entire system, plays a key role in improving data sending performance of a control layer plane and a data plane.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 2:
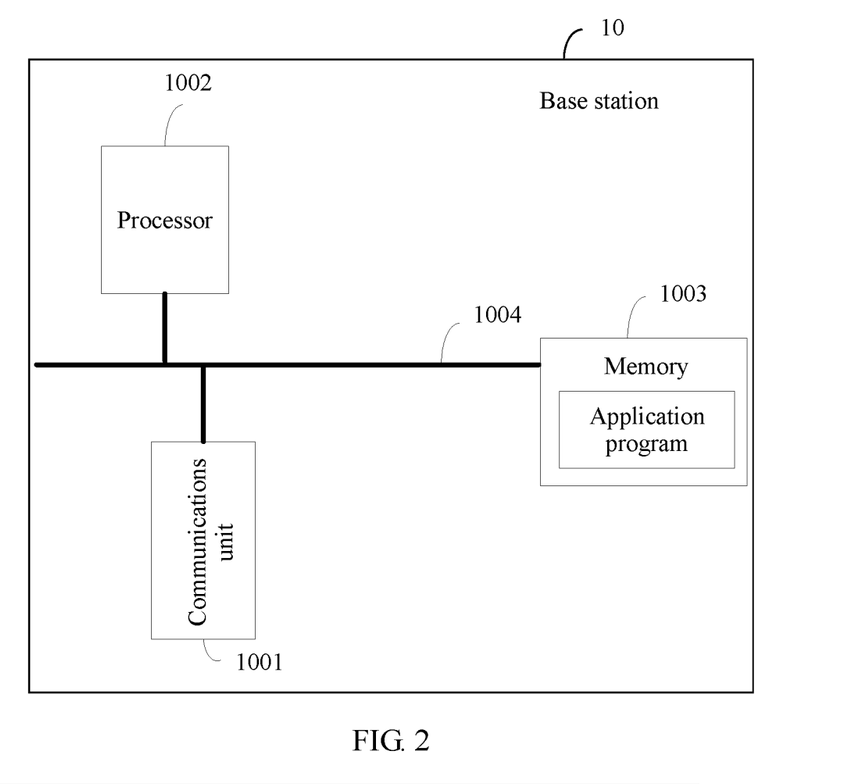
FIG. 2 is a structural diagram of a base station 10 according to an embodiment of the present invention.

FIG. 2 is a schematic structural diagram of a base station 10 according to an embodiment of the present invention. The base station 10 is configured to perform the method, which is provided in the embodiments of the present invention, for transmitting a CSI-RS. As shown in FIG. 2, the base station may include: a communications unit 1001, a processor 1002, a memory 1003, and at least one communications bus 1004 that is configured to implement a connection and mutual communication between these apparatuses.

The communications unit 1001 may be configured to transmit a signal to an external network element.

The processor 1002 may be a central processing unit (central processing unit, CPU for short), may be an application-specific integrated circuit (Application Specific Integrated Circuit, ASIC), or may be one or more integrated circuits configured to implement the embodiments of the present invention, such as one or more microprocessors (digital signal processor, DSP) or one or more field programmable gate arrays (Field Programmable Gate Array, FPGA).

The memory 1003 may be a volatile memory (volatile memory), such as a random-access memory (random-access memory, RAM); or a non-volatile memory (non-volatile memory), such as a read-only memory (read-only memory, ROM), a flash memory (flash memory), a hard disk drive (hard disk drive, HDD), a solid-state drive (solid-state drive, SSD), or a combination of the foregoing types of memories.

The communications bus 1004 may be classified into an address bus, a data bus, a control bus, and the like, and may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. For ease of illustration, the bus in FIG. 2 is represented by using only one bold line, but it does not mean that there is only one bus or one type of bus.

Specifically, the processor 1002 is configured to aggregate first configuration modes of K channel state information-reference signals CSI-RSs, to form a second configuration mode of the CSI-RSs, where K is an integer greater than or equal to 2, each of the first configuration modes is a configuration mode of X ports, a value of X is 2, 4, or 8, and the first configuration mode includes a position of a resource element corresponding to each of the X ports; the second configuration mode is a configuration mode of X*K ports, and the second configuration mode includes a position of a resource element corresponding to each of the X*K ports.

The communications unit 1001 is configured to send a CSI-RS to user equipment UE by using the second configuration mode of the CSI-RSs.

Compared with the prior art, in this embodiment of the present invention, a quantity of ports of a system is increased by means of aggregation of existing port configuration modes. This slightly affects a conventional network and a terminal, greatly improves a data throughput and performance of an entire system, plays a key role in improving data sending performance of a control layer plane and a data plane, and resolves an existing problem of a relatively large system performance loss caused by increasing a quantity of ports by using orthogonality of a time domain or a frequency domain.

For ease of description, Embodiment 1 shows and describes, in detail by using steps, the method, which is provided in the embodiments of the present invention, for transmitting a CSI-RS. In addition to the base station 10, the shown steps may be performed in a group of computer systems that can execute instructions. In addition, even though a logical sequence is shown in the figure, in some cases, the shown or described steps may be performed in a sequence different from the sequence herein.

Embodiment 1

Figure 3:
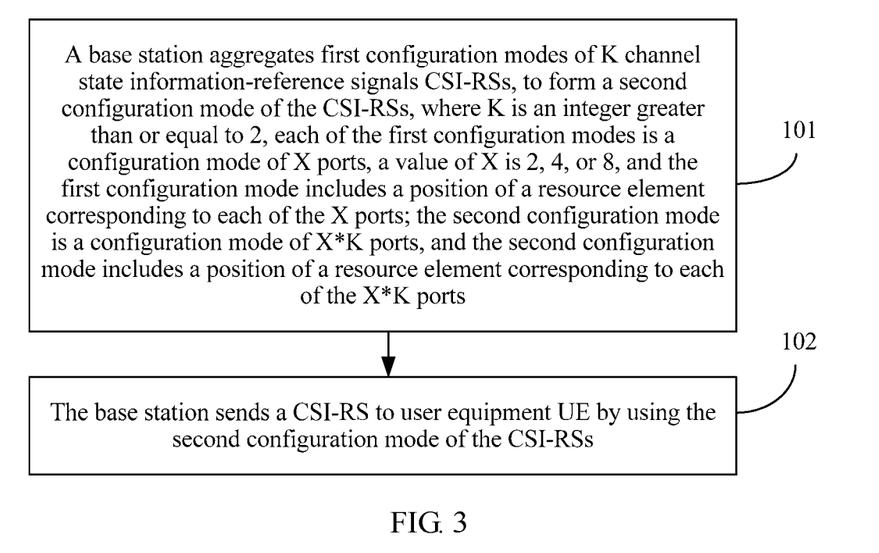
FIG. 3 is a flowchart of a method for designing a CSI-RI port according to an embodiment of the present invention.

FIG. 3 is a flowchart of a channel measurement method for designing a CSI-RS port according to an embodiment of the present invention. The base station shown in FIG. 2 executes the channel measurement method, an execution body is UE, and the channel measurement method is used to design a CSI-RS port in one frame or one PRB pair. As shown in FIG. 3, the method includes the following steps.

101: The base station aggregates first configuration modes of K channel state information-reference signals CSI-RSs, to form a second configuration mode of the CSI-RSs, where K is an integer greater than or equal to 2, each of the first configuration modes is a configuration mode of X ports, a value of X is 2, 4, or 8, and the first configuration mode includes a position of a resource element corresponding to each of the X ports; the second configuration mode is a configuration mode of X*K ports, and the second configuration mode includes a position of a resource element corresponding to each of the X*K ports.

Figure 4A:
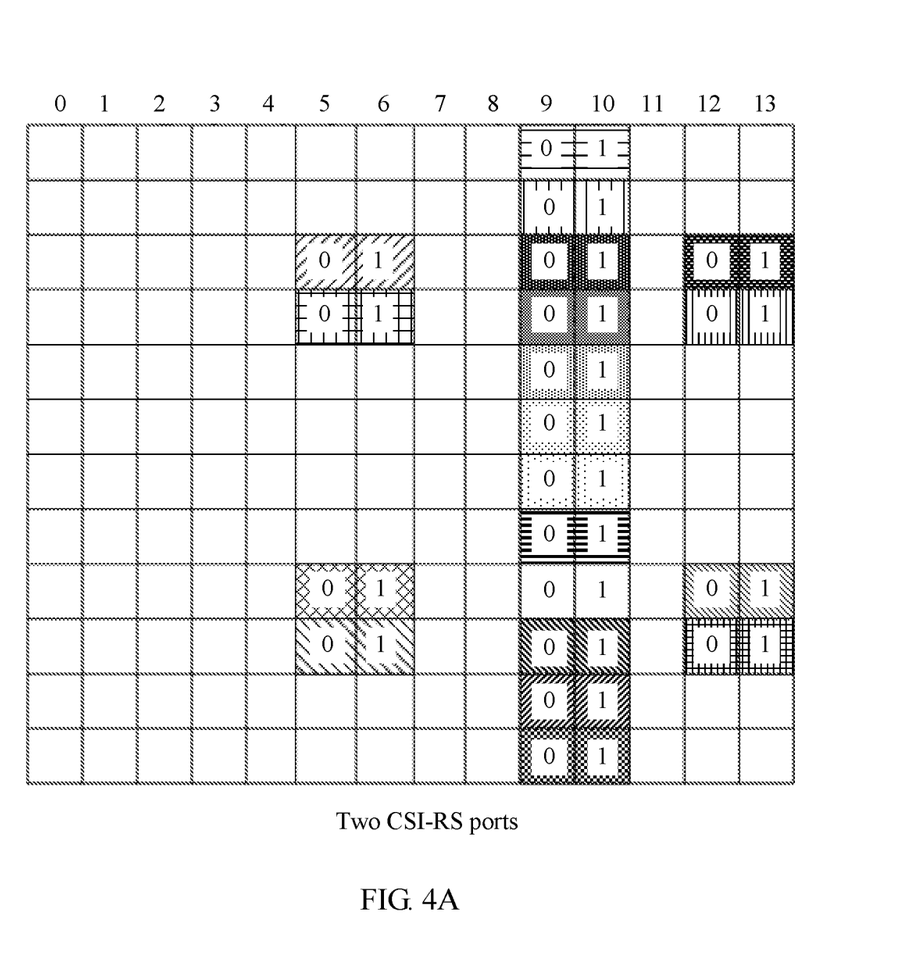
FIGS. 4A, 4B, and 4C show reference signals of existing configuration modes of two, four, and eight CSI-RI ports.
Figure 4B:
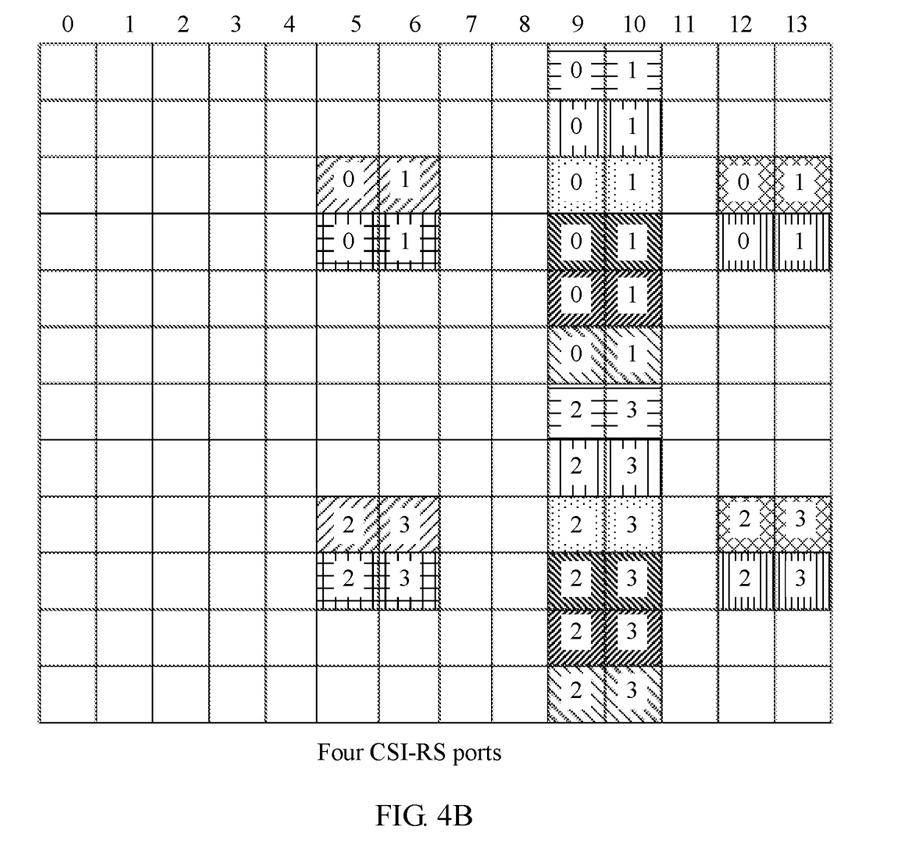
Figure 4C:
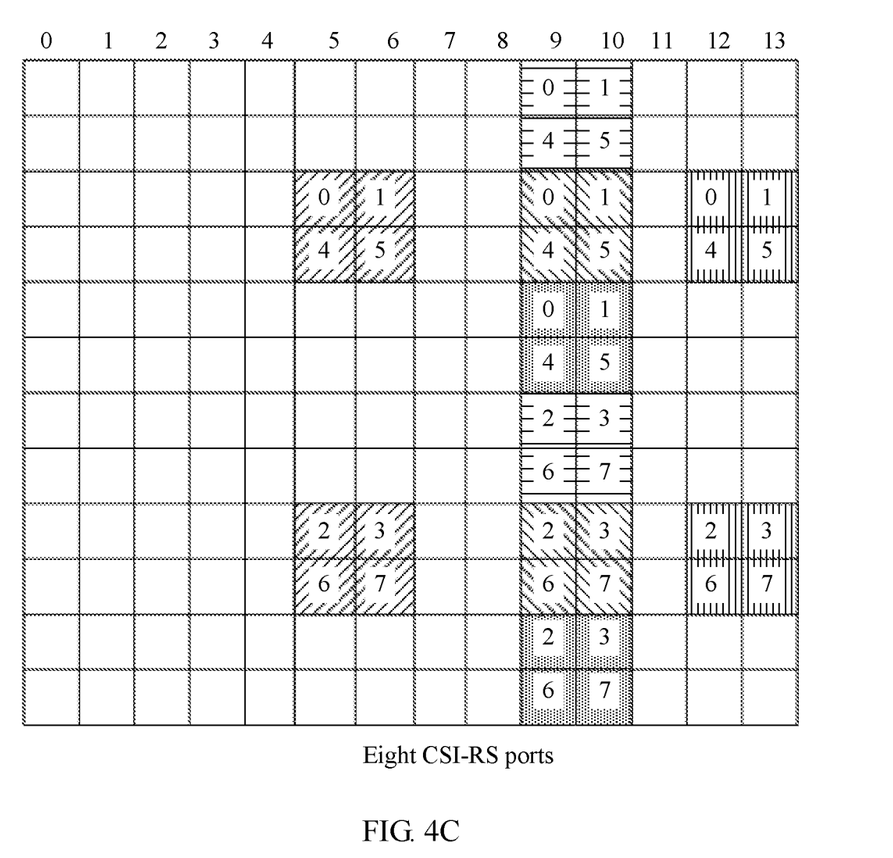

The first configuration mode may be a configuration mode of two, four, or eight ports specified in an existing LTE system Release 12 (Release 12). For example, FIG. 4 is design sample drawings of two, four, and eight ports in the existing LTE system Release 12 (Release 12), and the design sample drawings include a resource element (Resource Element, RE) occupation case of various different configurations of two, four, and eight CSI-RS ports in one physical resource block (PRB) pair in the current system. The sample drawings are embodied in one physical resource block (PRB) pair, and occupy one subframe in a time domain. Each subframe includes two slots (slot): a slot 0 and a slot 1. The two slots respectively correspond to the first seven orthogonal frequency division multiplexing (Orthogonal Frequency Division Multiplexing, OFDM) symbols and the last seven OFDM symbols according to a normal cyclic prefix. The sample drawings occupy 12 subcarriers (Subcarrier) in a frequency domain. In each port configuration sample drawing, resource elements filled with a same pattern form a first configuration mode of one CSI-RS. For example, in the sample drawing of two CSI-RS ports shown in FIG. 4, on a same subcarrier, if filling patterns of resource elements corresponding to a symbol 5 and a symbol 6 are the same, resource elements of the symbol 5 and the symbol 6 on the subcarrier may form a 2-port configuration mode. In addition, besides the CSI-RS reference signal, the sample drawing shown in FIG. 4 may further include a reference signal, such as a cell-specific reference signal (Cell-specific Reference Signal, CRS) or a demodulation reference signal (Demodulation Reference Signal, DMRS). It may be understood that if the reference signal such as the CRS or the DMRS needs to support a multi-port mode, the method described in step 101 may also be used, and configuration modes with a large quantity of ports are aggregated by using a configuration mode of the existing reference signal such as the CRS or the DMRS.

Optionally, in one PRB pair, the base station may aggregate, in an aggregation manner of a frequency domain before a time domain, the first configuration modes of the K channel state information-reference signals CSI-RSs to form a second configuration mode of a second CSI-RS. The aggregation manner of a frequency domain before a time domain is: In a PRB pair using a configuration mode of X ports, a position of a resource element corresponding to a CSI-RS in the PRB pair is viewed, a resource element corresponding to a CSI-RS having an earliest time and lowest frequency is obtained, and configurations of the X ports including the resource element are aggregated. If no CSI-RS exists at another frequency within the time, a CSI-RS within a next time adjacent to the time is obtained, and aggregation is performed in ascending order of frequency.

As shown in FIG. 4, in one PRB pair, X ports of CSI-RSs may have 40/X configuration modes. For example, two ports have 20 configuration modes, four ports have 10 configuration modes, or eight ports have five configuration modes. Therefore, in this embodiment of the present invention, K needs to be less than or equal to 40/X. If K is equal to 40/X, it indicates that first configuration modes of all CSI-RSs in one PRB pair are all aggregated. If K is less than 40/X, it indicates that first configuration modes of some CSI-RSs in one PRB pair are all aggregated. It can be understood that, when the first configuration modes of some CSI-RSs in the PRB pair are all aggregated, first configuration modes of any K CSI-RSs may be selected from the 40/X configuration modes for aggregation. The aggregation may be continuous aggregation, or may be discontinuous aggregation. This is not limited in this embodiment of the present invention.

102: The base station sends a CSI-RS to user equipment UE by using the second configuration mode of the CSI-RSs.

Optionally, after the UE receives the CSI-RS that is sent by the base station by using the second configuration mode of the CSI-RSs, to enable the UE to accurately perform channel state measurement according to the CSI-RSs, determine channel state information, and feed back the channel state information to the base station, before step 102, the method may further include:

sending, by the base station, radio resource control RRC signaling or a system information block SIB message to the UE, where the RRC signaling or the SIB message includes a bit block, bits included in the bit block are in a one-to-one correspondence with first configuration modes of CSI-RSs included in the PRB pair, and the bits are used to indicate an aggregation status of the first configuration modes of the CSI-RSs corresponding to the bits.

Optionally, the aggregation status of the first configuration modes may be indicated by using bits 0 or bits 1. For example, if the bits are 1, it indicates that the first configuration modes of the CSI-RSs corresponding to the bits are aggregated; or if the bits are 0, it indicates that the first configuration modes of the CSI-RSs corresponding to the bits are not aggregated. Certainly, the aggregation status of the first configuration modes of the CSI-RSs may also be indicated in another manner. This is not limited in this embodiment of the present invention.

It should be noted that, to implement system compatibility, in a process of implementing the present invention, if a condition permits, port aggregation should be performed on first configuration modes having a relatively large quantity of ports to the greatest extent. For example, a 16-port configuration may be implemented by aggregating four 4-port configuration modes or may be implemented by aggregating two 8-port configuration modes. However, to implement system compatibility, if the condition permits, two 8-port configuration modes should be aggregated as the 16-port configuration mode to the greatest extent.

In addition, in an LTE system, reference signals in each PRB pair may be numbered from 0 to 14. Therefore, to avoid repetition of the existing numbers in the existing LTE system, in this embodiment of the present invention, a port of the second configuration mode obtained after aggregation starts to be numbered from 15, and specific implementation is as follows:

a port number n of the second configuration mode of the CSI-RSs is:

$$n = i*N + p, (p = 15, \ldots, 14+N); \text{ or}$$

$$n = \begin{cases} p + \frac{N}{2}i & \text{for } p = 15, \ldots, 14+N/2 \\ p + \frac{N}{2}(i+K-1) & \text{for } p = 15+N/2, \ldots, 14+N \end{cases},$$

where $i \in \{0, 1, \ldots, K-1\}$, i indicates a first configuration mode of an $i^{th}$ CSI-RS in the first configuration modes of the K CSI-RSs, and N is a quantity of ports corresponding to the second configuration mode of the CSI-RSs.

For example, if the second configuration mode is a 16-port configuration mode, port numbers after aggregation are 15, 16, ..., and 30; or if the second configuration mode is a 12-port configuration mode, port numbers after aggregation are 15, 16, ..., and 26.

Certainly, it may be understood that a port of the second configuration mode not only may start to be numbered from 15, but also may start to be numbered from 16, 17, or another number greater than 14. This is not limited in this embodiment of the present invention.

An aggregation status of configuration modes of X ports is indicated below by using the bits 0 or the bits 1. Information bit encoding is performed for aggregation cases of ports 2, 4, and 8 in the current LTE system shown in FIG. 4 (for example, for an aggregation case of the port 2, 20 bits may be used to perform corresponding mapping; for an aggregation case of the port 4, 10 bits are used to perform corresponding mapping; for an aggregation case of the port 8, five bits may be used to perform corresponding mapping).

Figure 5:
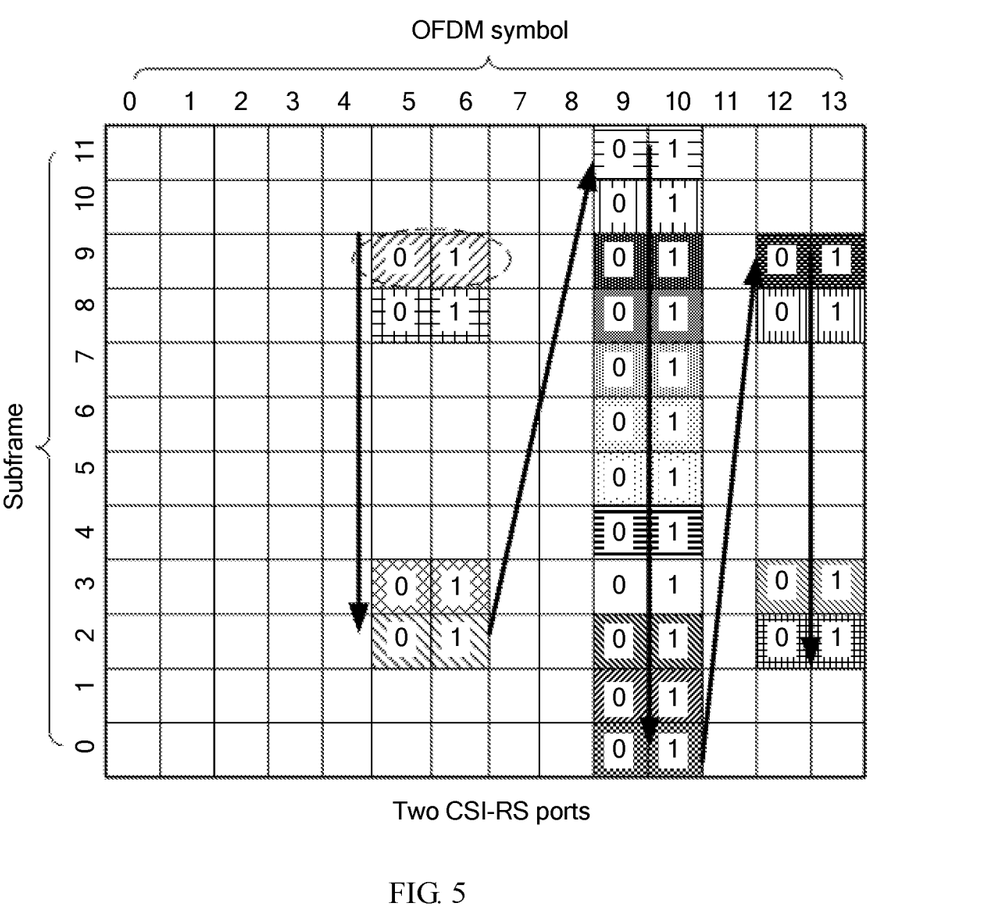
FIG. 5 is a schematic diagram of aggregating a configuration mode of two ports into another port configuration mode according to an embodiment of the present invention.

As shown in FIG. 5, for a 2-port configuration mode, in a mapping manner of a frequency domain before a time domain, mapping of a first bit (when aggregation is performed, the first bit is mapped to 1, and when aggregation is not performed, the first bit is mapped to 0) is first performed on a first pair of REs (resource elements in a dashed line box, that is, two resource elements filled with a same pattern) of a symbol 5 and a symbol 6 on a subcarrier 9. Then, along an arrow direction, mapping of a second bit is performed on a second pair of REs of a symbol 5 and a symbol 6 on a subcarrier 8, mapping of a third bit is performed on a third pair of REs of a symbol 5 and a symbol 6 on a subcarrier 3, mapping of a fourth bit is performed on a fourth pair of REs of a symbol 5 and a symbol 6 on a subcarrier 2, and then corresponding mapping is performed on an RE pair of a symbol 9 and a symbol 10 on a subcarrier 11, and so on. If 2-port configuration modes in a PRB are all aggregated, an obtained bit block is: 11111111111111111111.

Figure 6:
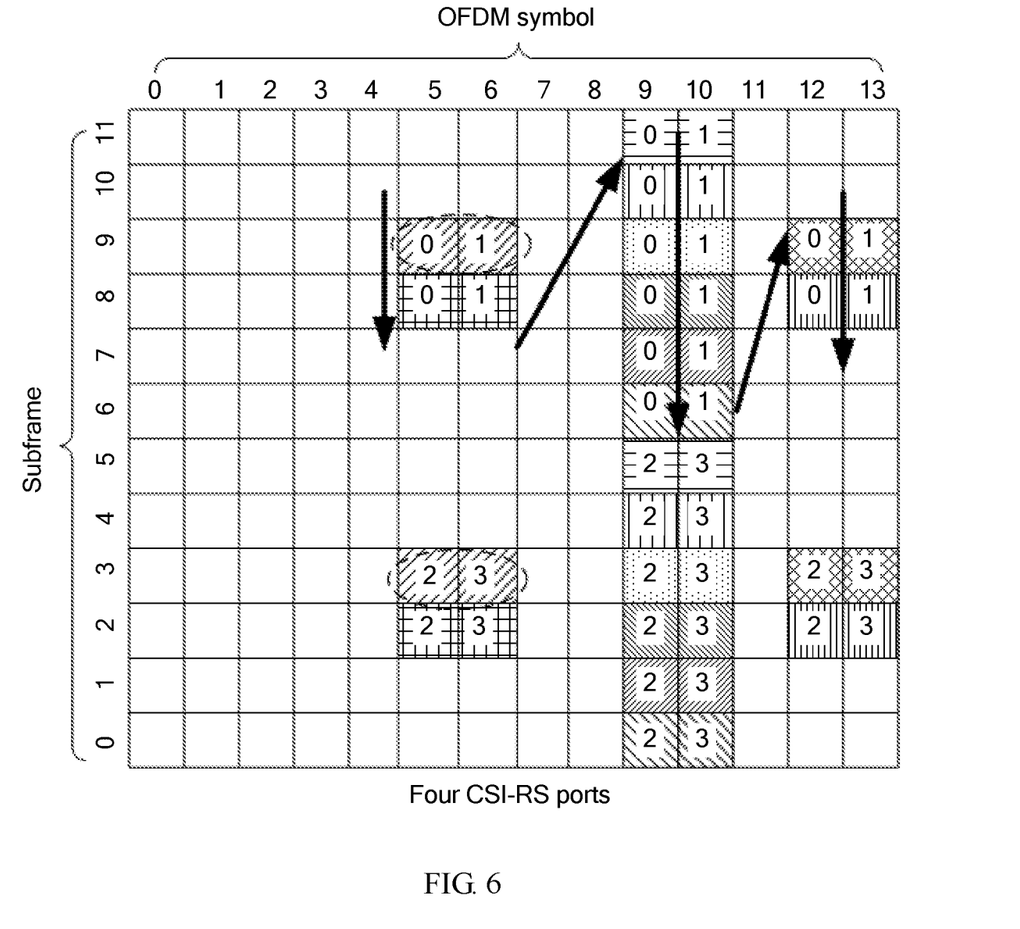
FIG. 6 is a schematic diagram of aggregating a configuration mode of four ports into another port configuration mode according to an embodiment of the present invention.

As shown in FIG. 6, for a 4-port configuration mode, in the mapping manner of a frequency domain before a time domain, mapping of a first bit is first performed on first configuration REs (that is, four resource elements filled with a same pattern, for example, four REs in a dashed line box) of a symbol 5 and a symbol 6. Then, along an arrow direction, mapping of a second bit is performed on second configuration REs (for example, four REs of the symbol 5 and the symbol 6 on a subcarrier 8 and a subcarrier 3), mapping of a third bit is performed on third configuration REs of a symbol 9 and a symbol 10, mapping of a fourth bit to an eighth bit is performed on a fourth configuration to an eighth configuration, and mapping of a ninth bit and a tenth bit is performed on a ninth configuration and a tenth configuration in a symbol 12 and a symbol 13. If 4-port configuration modes in the PRB are all aggregated, an obtained bit block is: 1111111111.

Figure 7:
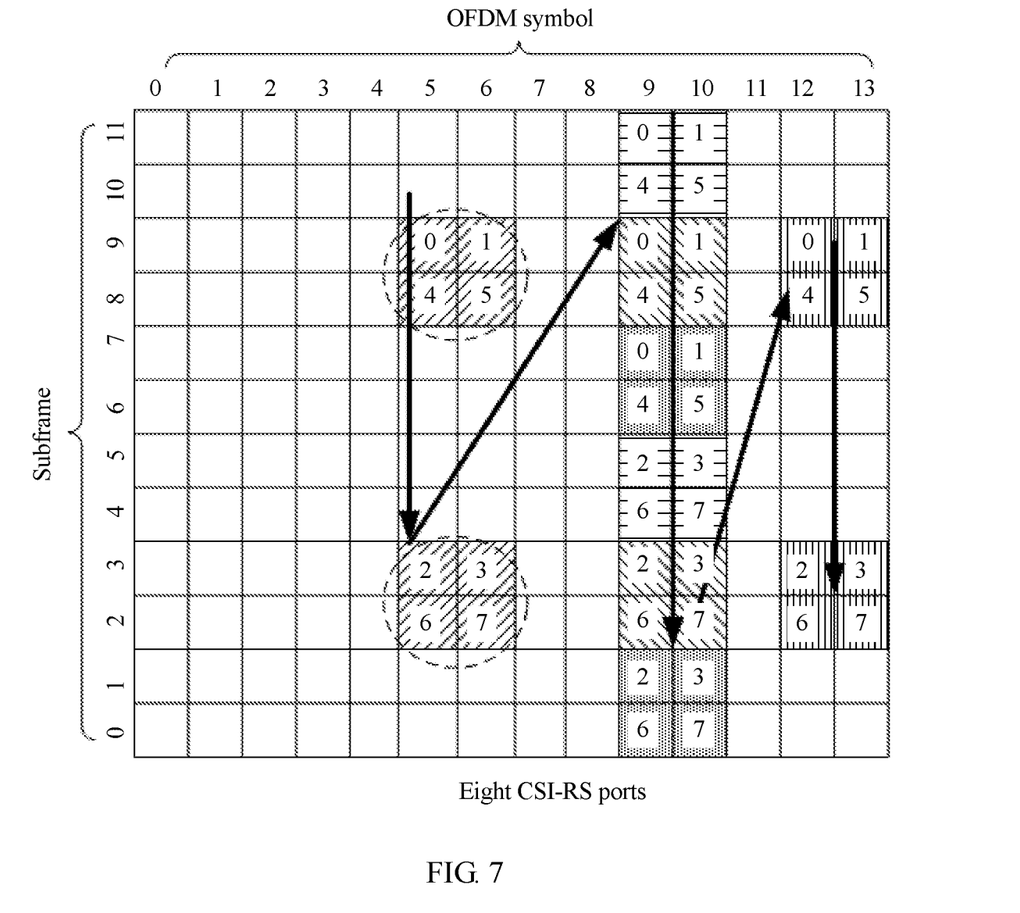
FIG. 7 is a schematic diagram of aggregating a configuration mode of eight ports into another port configuration mode according to an embodiment of the present invention.

As shown in FIG. 7, for an 8-port configuration mode, also in the mapping manner of a frequency domain before a time domain, mapping of a first bit is first performed on first configuration REs (that is, eight resource elements filled with a same pattern, for example, eight REs in a dashed line box) of a symbol 5 and a symbol 6. Then, mapping of a second bit, a third bit, and a fourth bit is performed on a second configuration, a third configuration, and a fourth configuration of a symbol 9 and a symbol 10, and mapping of a fifth bit is performed on a fifth configuration in a symbol 12 and a symbol 13. In this case, if 8-port configuration modes in the PRB are all aggregated, an obtained bit block is: 11111.

It can be learned from the foregoing description that, this embodiment of the present invention provides a method for transmitting a CSI-RS. The base station first aggregates the first configuration modes of the K channel state information-reference signals CSI-RSs, to form the second configuration mode of the CSI-RSs, where K is an integer greater than or equal to 2, each of the first configuration modes is a configuration mode of the X ports, the value of X is 2, 4, or 8, and the first configuration mode includes the position of the resource element corresponding to each of the X ports; the second configuration mode is a configuration mode of the X*K ports, and the second configuration mode includes the position of the resource element corresponding to each of the X*K ports; and then the base station sends a CSI-RS to the user equipment UE by using the second configuration mode of the CSI-RSs. In this way, a quantity of ports of a system is increased by means of aggregation of existing port configuration modes. This slightly affects a conventional network and a terminal, greatly improves a data throughput and performance of an entire system, plays a key role in improving data sending performance of a control layer plane and a data plane, and resolves an existing problem of a relatively large system performance loss caused by increasing a quantity of ports by using orthogonality of a time domain or a frequency domain.

According to this embodiment of the present invention, the following embodiment of the present invention further provides a base station 20. Preferably, the base station 20 is configured to perform the method described in Embodiment 1.

Embodiment 2

Figure 8:
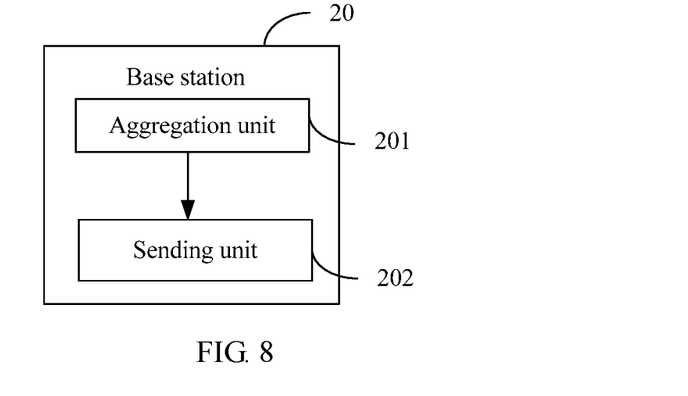
FIG. 8 is a structural diagram of a base station 20 according to an embodiment of the present invention.

FIG. 8 is a structural diagram of a base station 20 according to an embodiment of the present invention. As shown in FIG. 8, the base station 20 may include:

an aggregation unit 201, configured to aggregate first configuration modes of K channel state information-reference signals CSI-RSs, to form a second configuration mode of the CSI-RSs, where K is an integer greater than or equal to 2, each of the first configuration modes is a configuration mode of X ports, a value of X is 2, 4, or 8, and the first configuration mode includes a position of a resource element corresponding to each of the X ports; the second configuration mode is a configuration mode of X*K ports, and the second configuration mode includes a position of a resource element corresponding to each of the X*K ports; and a sending unit 202, configured to send a CSI-RS to user equipment UE by using the second configuration mode, which is obtained through aggregation by the aggregation unit, of the CSI-RSs.

The first configuration mode may be a configuration mode of two, four, or eight ports specified in an existing LTE system Release 12 (Release 12). For example, FIG. 4 is design sample drawings of two, four, and eight ports in the existing LTE system Release 12, and the design sample drawings include a resource element (Resource Element, RE) occupation case of various different configurations of two, four, and eight CSI-RS ports in one physical resource block (PRB) pair in the current system. The sample drawings are embodied in one physical resource block (PRB) pair, and occupy one subframe in a time domain. Each subframe includes two slots (slot): a slot 0 and a slot 1. The two slots respectively correspond to the first seven orthogonal frequency division multiplexing (Orthogonal Frequency Division Multiplexing, OFDM) symbols and the last seven OFDM symbols according to a normal cyclic prefix. The sample drawings occupy 12 subcarriers (Subcarrier) in a frequency domain. In each port configuration sample drawing, resource elements filled with a same pattern form a first configuration mode of one CSI-RS. For example, in the sample drawing of two CSI-RS ports shown in FIG. 4, on a same subcarrier, if filling patterns of resource elements corresponding to a symbol 5 and a symbol 6 are the same, resource elements of the symbol 5 and the symbol 6 on the subcarrier may form a 2-port configuration mode.

Optionally, the aggregation unit 201 may aggregate, in an aggregation manner of a frequency domain before a time domain, the first configuration modes of the K channel state information-reference signals CSI-RSs to form a second configuration mode of a second CSI-RS. The aggregation manner of a frequency domain before a time domain is: In a PRB pair using a configuration mode of X ports, a position of a resource element corresponding to a CSI-RS in the PRB pair is viewed, a resource element corresponding to a CSI-RS having an earliest time and lowest frequency is obtained, and configurations of the X ports including the resource element are aggregated. If no CSI-RS exists at another frequency within the time, a CSI-RS within a next time adjacent to the time is obtained, and aggregation is performed in ascending order of frequency.

Optionally, after the UE receives the CSI-RS that is sent by the sending unit 202 by using the second configuration mode of the CSI-RSs, to enable the UE to accurately perform channel state measurement according to the CSI-RSs, determine channel state information, and feed back the channel state information to the base station, the sending unit 202 may further be configured to:

send radio resource control RRC signaling or a system information block SIB message to the UE, where the RRC signaling or the SIB message includes a bit block, bits included in the bit block are in a one-to-one correspondence with first configuration modes of CSI-RSs included in the PRB pair, and the bits are used to indicate an aggregation status of the first configuration modes of the CSI-RSs corresponding to the bits.

Optionally, the aggregation status of the first configuration modes may be indicated by using bits 0 or bits 1. For example, if the bits are 1, it indicates that the first configuration modes of the CSI-RSs corresponding to the bits are aggregated; or if the bits are 0, it indicates that the first configuration modes of the CSI-RSs corresponding to the bits are not aggregated. Certainly, the aggregation status of the first configuration modes of the CSI-RSs may also be indicated in another manner. This is not limited in this embodiment of the present invention.

It should be noted that, to implement system compatibility, in a process of implementing the present invention, if a condition permits, port aggregation should be performed on first configuration modes having a relatively large quantity of ports to the greatest extent. For example, a 16-port configuration may be implemented by aggregating four 4-port configuration modes or may be implemented by aggregating two 8-port configuration modes. However, to implement system compatibility, if the condition permits, two 8-port configuration modes should be aggregated as the 16-port configuration mode to the greatest extent.

In addition, in an LTE system, reference signals in each PRB pair may be numbered from 0 to 14. Therefore, to avoid repetition of the existing numbers in the existing LTE system, in this embodiment of the present invention, a port of the second configuration mode obtained after aggregation starts to be numbered from 15, and specific implementation is as follows:

a port number n of the second configuration mode of the CSI-RSs may be:

$$n = i*N + p, (p = 15, \ldots, 14+N); \text{ or}$$

$$n = \begin{cases} p + \dfrac{N}{2}i & \text{for } p = 15, \ldots, 14+N/2 \\ p + \dfrac{N}{2}(i+K-1) & \text{for } p = 15+N/2, \ldots, 14+N \end{cases},$$

where $i \in \{0, 1, \ldots, K-1\}$, i indicates a first configuration mode of an CSI-RS in the first configuration modes of the K CSI-RSs, N is a quantity of ports corresponding to the second configuration mode of the CSI-RSs, and N is a quantity of ports corresponding to the second configuration mode of the CSI-RSs.

For example, if the second configuration mode is a 16-port configuration mode, port numbers after aggregation are 15, 16, . . . , and 30; or if the second configuration mode is a 12-port configuration mode, port numbers after aggregation are 15, 16, ... , and 26.

Certainly, it may be understood that a port of the second configuration mode not only may start to be numbered from 15, but also may start to be numbered from 16, 17, or another number greater than 14. This is not limited in this embodiment of the present invention.

It can be learned from the foregoing description that, this embodiment of the present invention provides a base station. The base station first aggregates the first configuration modes of the K channel state information-reference signals CSI-RSs, to form the second configuration mode of the CSI-RSs, where K is an integer greater than or equal to 2, each of the first configuration modes is a configuration mode of the X ports, the value of X is 2, 4, or 8, and the first configuration mode includes the position of the resource element corresponding to each of the X ports; the second configuration mode is a configuration mode of the X*K ports, and the second configuration mode includes the position of the resource element corresponding to each of the X*K ports; and then the base station sends a CSI-RS to the user equipment UE by using the second configuration mode of the CSI-RSs. In this way, a quantity of ports of a system is increased by means of aggregation of existing port configuration modes. This slightly affects a conventional network and a terminal, greatly improves a data throughput and performance of an entire system, plays a key role in improving data sending performance of a control layer plane and a data plane, and resolves an existing problem of a relatively large system performance loss caused by increasing a quantity of ports by using orthogonality of a time domain or a frequency domain.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting a channel state information-reference signal (CSI-RS), comprising:
    aggregating, by a base station, first configuration modes of K CSI-RSs to form a second configuration mode of the CSI-RSs, wherein K is an integer greater than or equal to 2, wherein each of the first configuration modes is a configuration mode of X ports, wherein a value of X is 2, 4, or 8, and wherein the first configuration mode comprises a position of a resource element corresponding to each of the X ports, and wherein the second configuration mode is a configuration mode of X*K ports, and wherein the second configuration mode comprises a position of a resource element corresponding to each of the X*K ports;
    sending, by the base station, radio resource control (RRC) signaling or a system information block (SIB) message to a terminal, wherein the RRC signaling or the SIB message comprises a bit block, wherein bits comprised in the bit block are in a one-to-one correspondence with first configuration modes of CSI-RSs comprised in a physical resource block (PRB) pair, wherein the bits are used to indicate an aggregation/non-aggregation status of the first configuration modes of the CSI-RSs corresponding to the bits, wherein the aggregation/non-aggregation status of the first configuration modes is indicated using bits 0 or bits 1, wherein, when the bits are 1, the first configuration modes of the CSI-RSs corresponding to the bits are indicated as aggregated, and wherein, when the bits are 0, the first configuration modes of the CSI-RSs corresponding to the bits are indicated as not aggregated; and
    sending, by the base station, a CSI-RS to the terminal using the second configuration mode of the CSI-RSs.

2. The method according to claim 1, wherein a port number n of the second configuration mode of the CSI-RSs is:

$$n = i*N + p, (p=15, \ldots, 14+N), \text{ wherein}$$

$i \in \{0, 1, \ldots, K-1\}$, wherein i indicates a first configuration mode of an $i^{th}$ CSI-RS in the first configuration modes of the K CSI-RSs, and wherein N is a quantity of ports corresponding to the second configuration mode of the CSI-RSs.

3. The method according to claim 1, wherein a port number n of the second configuration mode of the CSI-RSs is:

$$n = i*N + p, (p=15, \ldots, 14+N), \text{ wherein}$$

$i \in \{0, 1, \ldots, K-1\}$, wherein i indicates a first configuration mode of an $i^{th}$ CSI-RS in the first configuration modes of the K CSI-RSs, and wherein N is a quantity of ports corresponding to the second configuration mode of the CSI-RSs.

4. The method according to claim 1, wherein a port number n of the second configuration mode of the CSI-RSs is:

$$n = i*N + p, (p=15, \ldots, 14+N), \text{ wherein}$$

$i \in \{0, 1, \ldots, K-1\}$, wherein i indicates a first configuration mode of an $i^{th}$ CSI-RS in the first configuration modes of the K CSI-RSs, and wherein N is a quantity of ports corresponding to the second configuration mode of the CSI-RSs.

5. The method according to claim 1, wherein a port number n of the second configuration mode of the CSI-RSs is:

$$n = \begin{cases} p + \dfrac{N}{2}i & \text{for } p = 15, \ldots, 14 + N/2 \\ p + \dfrac{N}{2}(i+K-1) & \text{for } p = 15 + N/2, \ldots, 14 + N \end{cases},$$

wherein
$i \in \{0, 1, \ldots, K-1\}$, wherein i indicates a first configuration mode of an $i^{th}$ CSI-RS in the first configuration modes of the K CSI-RSs, and wherein N is a quantity of ports corresponding to the second configuration mode of the CSI-RSs.

6. The method according to claim 1, wherein a port number n of the second configuration mode of the CSI-RSs is:

$$n = \begin{cases} p + \dfrac{N}{2}i & \text{for } p = 15, \ldots, 14 + N/2 \\ p + \dfrac{N}{2}(i+K-1) & \text{for } p = 15 + N/2, \ldots, 14 + N \end{cases},$$

wherein
$i \in \{0, 1, \ldots, K-1\}$, i indicates a first configuration mode of an $i^{th}$ CSI-RS in the first configuration modes of the K CSI-RSs, and N is a quantity of ports corresponding to the second configuration mode of the CSI-RSs.

7. The method according to claim 1, wherein a port number n of the second configuration mode of the CSI-RSs is:

$$n = \begin{cases} p + \frac{N}{2}i & \text{for } p = 15, \ldots, 14 + N/2 \\ p + \frac{N}{2}(i + K - 1) & \text{for } p = 15 + N/2, \ldots, 14 + N \end{cases},$$

wherein i∈{0, 1, . . . , K−1}, wherein i indicates a first configuration mode of an $i^{th}$ CSI-RS in the first configuration modes of the K CSI-RSs, and wherein N is a quantity of ports corresponding to the second configuration mode of the CSI-RSs.

8. A base station, comprising:
at least one processor;
a memory comprising instructions;
a transmitter; and
a system bus,
wherein the memory and the transmitter are coupled to the at least one processor using the system bus,
wherein the at least one processor is configured to aggregate first configuration modes of K channel state information-reference signals (CSI-RSs), to form a second configuration mode of the CSI-RSs, wherein K is an integer greater than or equal to 2, each of the first configuration modes is a configuration mode of X ports, a value of X is 2, 4, or 12, and the first configuration mode comprises a position of a resource element corresponding to each of the X ports; the second configuration mode is a configuration mode of X*K ports, and the second configuration mode comprises a position of a resource element corresponding to each of the X*K ports; and
wherein the transmitter is configured to:
send radio resource control (RRC) signaling or a system information block (SIB) message to a terminal, wherein the RRC signaling or the SIB message comprises a bit block, wherein bits comprised in the bit block are in a one-to-one correspondence with first configuration modes of CSI-RSs comprised in a physical resource block (PRB) pair, wherein the bits are used to indicate an aggregation/non-aggregation status of the first configuration modes of the CSI-RSs corresponding to the bits, wherein the aggregation/non-aggregation status of the first configuration modes is indicated using bits 0 or bits 1, wherein, when the bits are 1, the first configuration modes of the CSI-RSs corresponding to the bits are indicated as aggregated, and wherein, when the bits are 0, the first configuration modes of the CSI-RSs corresponding to the bits are indicated as not aggregated; and
send a CSI-RS to the terminal using the second configuration mode of the CSI-RSs obtained through aggregation by the at least one processor.

9. The base station according to claim 8, wherein a port number n of the second configuration mode of the CSI-RSs is:

$n = i*N + p, (p = 15, \ldots, 14+N)$, wherein i∈{0, 1, . . . , K−1}, wherein i indicates a first configuration mode of an $i^{th}$ CSI-RS in the first configuration modes of the K CSI-RSs, and wherein N is a quantity of ports corresponding to the second configuration mode of the CSI-RSs.

10. The base station according to claim 8, wherein a port number n of the second configuration mode of the CSI-RSs is:

$n = i*N + p, (p = 15, \ldots, 14+N)$, wherein i∈{0, 1, . . . , K−1}, wherein i indicates a first configuration mode of an $i^{th}$ CSI-RS in the first configuration modes of the K CSI-RSs, and wherein N is a quantity of ports corresponding to the second configuration mode of the CSI-RSs.

11. The base station according to claim 8, wherein a port number n of the second configuration mode of the CSI-RSs is:

$n = i*N + p, (p = 15, \ldots, 14+N)$, wherein i∈{0, 1, . . . , K−1}, wherein i indicates a first configuration mode of an $i^{th}$ CSI-RS in the first configuration modes of the K CSI-RSs, and wherein N is a quantity of ports corresponding to the second configuration mode of the CSI-RSs.

12. The base station according to claim 8, wherein a port number n of the second configuration mode of the CSI-RSs is:

$$n = \begin{cases} p + \frac{N}{2}i & \text{for } p = 15, \ldots, 14 + N/2 \\ p + \frac{N}{2}(i + K - 1) & \text{for } p = 15 + N/2, \ldots, 14 + N \end{cases},$$

wherein i∈{0, 1, . . . , K−1}, wherein i indicates a first configuration mode of an $i^{th}$ CSI-RS in the first configuration modes of the K CSI-RSs, and wherein N is a quantity of ports corresponding to the second configuration mode of the CSI-RSs.

13. The base station according to claim 8, wherein a port number n of the second configuration mode of the CSI-RSs is:

$$n = \begin{cases} p + \frac{N}{2}i & \text{for } p = 15, \ldots, 14 + N/2 \\ p + \frac{N}{2}(i + K - 1) & \text{for } p = 15 + N/2, \ldots, 14 + N \end{cases},$$

wherein i∈{0, 1, . . . , K−1}, wherein i indicates a first configuration mode of an $i^{th}$ CSI-RS in the first configuration modes of the K CSI-RSs, and wherein N is a quantity of ports corresponding to the second configuration mode of the CSI-RSs.

14. The base station according to claim 8, wherein a port number n of the second configuration mode of the CSI-RSs is:

$$n = \begin{cases} p + \frac{N}{2}i & \text{for } p = 15, \ldots, 14 + N/2 \\ p + \frac{N}{2}(i + K - 1) & \text{for } p = 15 + N/2, \ldots, 14 + N \end{cases},$$

wherein i∈{0, 1, . . . , K−1}, wherein i indicates a first configuration mode of an $i^{th}$ CSI-RS in the first configuration modes of the K CSI-RSs, and wherein N is a quantity of ports corresponding to the second configuration mode of the CSI-RSs.

* * * * *